O. F. SCOTT.
STALK CHOPPER.
APPLICATION FILED FEB. 5, 1913.
1,083,635.
Patented Jan. 6, 1914.
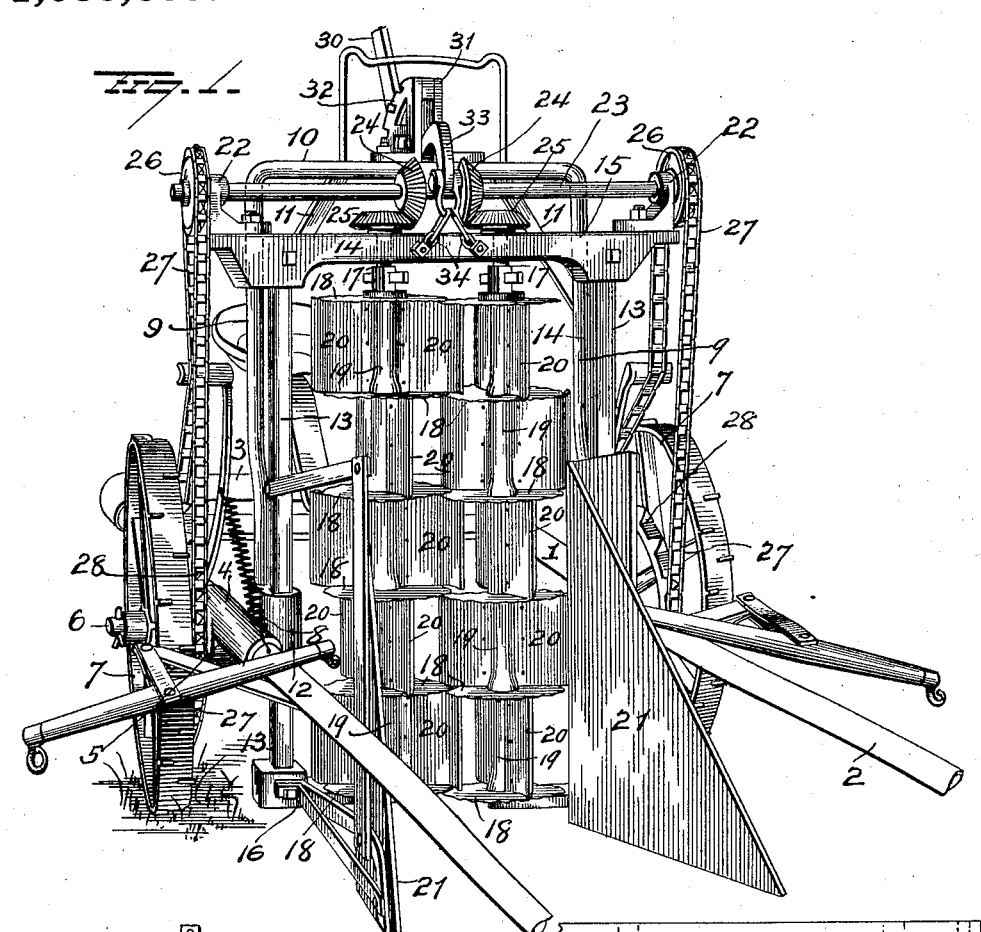
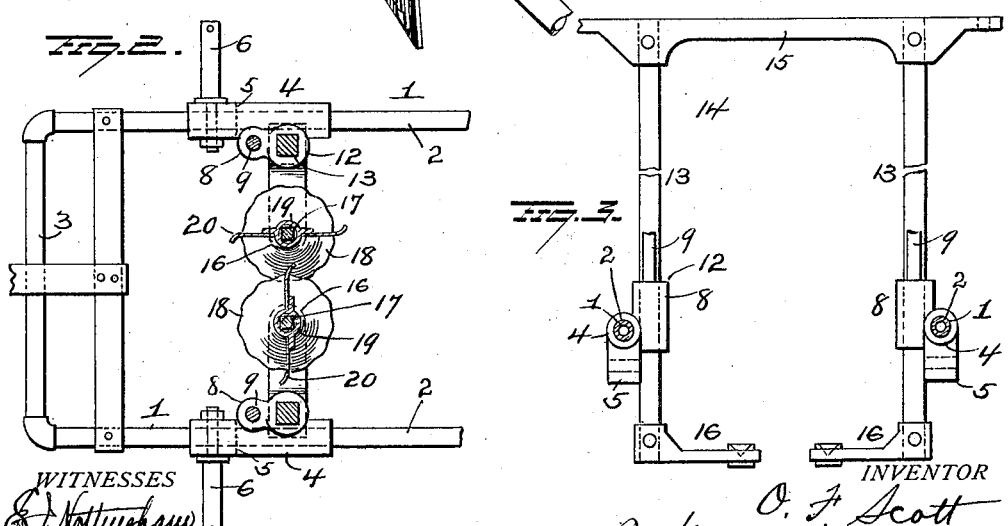
WITNESSES
E. L. Nottingham
G. F. Downing
INVENTOR
O. F. Scott
By H. A. Seymour
Attorney

UNITED STATES PATENT OFFICE.

OSCAR FRANKLIN SCOTT, OF GAINESVILLE, TEXAS.

STALK-CHOPPER.

1,083,635.

Specification of Letters Patent.

Patented Jan. 6, 1914.

Application filed February 5, 1913. Serial No. 746,405.

*To all whom it may concern:*

Be it known that I, OSCAR F. SCOTT, of Gainesville, in the county of Cooke and State of Texas, have invented certain new and useful Improvements in Stalk-Choppers; and I do hereby declare the following to be a full, clear, and exact description of the invention, such as will enable others skilled in the art to which it appertains to make and use the same.

This invention relates to improvements in stalk choppers and more particularly to that type in which superimposed horizontal cutters are employed,—and the invention consists in certain novel features of construction and combinations of parts as hereinafter set forth and pointed out in the claims.

In the accompanying drawings, Figure 1 is a front elevation partly in section of a machine embodying my improvements; Fig. 2 is a horizontal sectional view of a portion of the machine, and Fig. 3 is a view showing the vertical framework in rear elevation and partly broken away.

1 represents a horizontal U-shaped base frame, which may be conveniently made of piping, and the side members of this frame are extended forwardly to form shafts 2 connected at their rear ends by a cross bar 3.

On the side members or shafts 2 of the base frame 1, sleeves 4 are secured and provided with socketed bosses or enlargements 5 in which spindles 6 for carrying wheels 7 are secured. The sleeves 4 are also provided with vertically disposed bosses 8 in which the lower ends of the parallel members of an inverted U-shaped axle 9 are secured, the horizontal or connecting bar 10 of said axle being connected with the side members by means of braces 11. The sleeves 4 are also provided with guides 12 having angular bores for the passage of the side members 13 of a vertical cutter frame 14 disposed approximately parallel with the U-axle 9 and having a cross-head 15 located near the cross bar 10 of said U axle. The side bars 13 of the cutter frame (which may be made of tubing, angular in cross section) extend below the sleeves 4 and are provided at their lower ends, with inwardly projecting arms 16,—the inner ends of which latter are, spaced apart. The lower end of the cutter frame is thus divided, and the coöperating cutting edges of cutters mounted in said frame (as hereinafter described) will be disposed directly over the space between the inner ends of the arms 16 constituting the bottom of said frame. The construction of the frame 14 as above described will admit of its lower member being split without weakening the structure and lateral spreading of said frame at its lower end will be effectually prevented by the U-axle 9. By such construction, winding of weeds, etc., on the base member of the cutter frame will be avoided.

The inwardly projecting arms 16, constituting the base member of the cutter frame, afford bearings for the lower ends of vertically disposed cutter shafts 17—17,—the upper ends of said shafts having bearings in the cross-head 15 of said frame. The shafts 17 (which are angular in cross section) are arranged parallel with each other, and on each shaft, a plurality of superimposed circular cutters 18 (having toothed peripheral edges) are secured. The cutters on each shaft are spaced apart by means of hubs 19, and to said hubs, paddles 20 are secured. These paddles may be made of steel, wood, leather, card-board or any other suitable material, and each paddle is of such height as to extend from one cutting disk to the next. Each paddle may be made with a rearwardly-curved free end which projects beyond the edges of the cutting disks of one set and underlies the edges of the cutting disks of the other set.

Two paddles may be located between each two disks of each set, or, if desired, a single paddle may be located between each two disks, the paddles between the disks of one series being made to alternate with the paddles between the disks of the other series. By the provision of the paddles, as above explained, the stalks will be properly fed to the cutters, and choking of the machine by winding of stalks, grass, etc., on the shafts 17 or the hubs thereon, will be effectually prevented. Furthermore, the rearwardly-curved ends of the paddles will operate to throw the cut stalks from the cutters, and by causing the projecting ends of the paddles between the cutting disks of one set to overlie the cutting disks of the other set, all the stalks will be properly drawn to the cutters.

In order that the growing stalks shall be properly directed to the cutting mechanism above described, guards 21 are provided.

Brackets 22 are located upon the ends of the cross-head 15 of the cutter frame and provide bearings for a horizontal shaft 23— to which latter, pinions 24 are secured and mesh with pinions 25 on the upper ends of the cutter shafts 17. The shaft 23 is provided at its respective ends with sprocket wheels 26 to which motion is transmitted by means of sprocket chains 27 from sprocket wheels 28 rotatable with the carrying wheels 7. The chains 27 are of sufficient length to permit vertical adjustment of the cutter frame and are maintained normally taut by means of yielding chain tighteners 29.

To facilitate the raising and lowering of the cutter frame, a lever 30 is provided. This lever is pivotally attached to a bracket 31 mounted upon the cross bar 10 of the U-axle 9 and the latter carries a toothed segment 32 to be engaged by a detent on the lever. The short arm 33 of the lever 30 is preferably curved and projects over the cross head 15 of the cutter frame 14, to which said arm 33 of the lever is connected by means of chains or links 34. It is apparent that when the lever 30 is moved in one direction, the cutting mechanism will be raised and that when the lever is released, the cutting mechanism will descend by gravity.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a stalk chopper, the combination with an upright U-axle, wheels, and spindles for the wheels connected with said U-axle, of an upright cutter frame, connections between said cutter frame and U-axle, said cutter frame having inwardly projecting arms at its lower end spaced from each other, two sets of superimposed horizontal cutters, shafts for said cutters having mountings in said inwardly projecting arms and in the cross head of said cutter frame.

2. In a stalk cutter, the combination with an axle, a horizontal frame, carrying wheels, and spindles for said wheels carried by the horizontal frame, of an upright cutter frame, guides for the latter carried by the horizontal frame, said cutter frame having a cross head at its upper end and inwardly projecting arms at the lower end, parallel upright shafts mounted between said cross head and inwardly projecting arms, horizontal cutters on said shafts, and means for driving said shafts and cutters.

3. In a stalk chopper, the combination with a wheeled frame, and an upright cutter frame, of two sets of superimposed horizontal cutters mounted in the cutter frame, means for supporting said cutters, paddles disposed between the cutters and extending from one to the other, and means for driving the cutters and paddles.

4. In a stalk cutter, the combination with a wheeled frame and an upright cutter frame, of two sets of superimposed horizontal cutters, means for supporting said cutters in the cutter frame, paddles disposed between the cutters and extending from one cutter to another, the paddles between the cutters of one set adapted to project partially over cutters of the other set, and means for driving the cutters and paddles.

5. In a stalk chopper, the combination with a wheeled frame and an upright cutter frame, of two sets of superimposed horizontal cutters, means for supporting said cutters in the cutter frame, paddles disposed between the cutters and extending from one cutter to another, the free ends of said paddles being curved rearwardly, and means for driving the cutters and paddles.

In testimony whereof, I have signed this specification in the presence of two subscribing witnesses.

OSCAR FRANKLIN SCOTT.

Witnesses:
W. J. SCOTT,
F. H. SHERWOOD.